H. K. PHIPPS.
PLOW ATTACHMENT.
APPLICATION FILED JAN. 24, 1913.
1,093,073.
Patented Apr. 14, 1914.
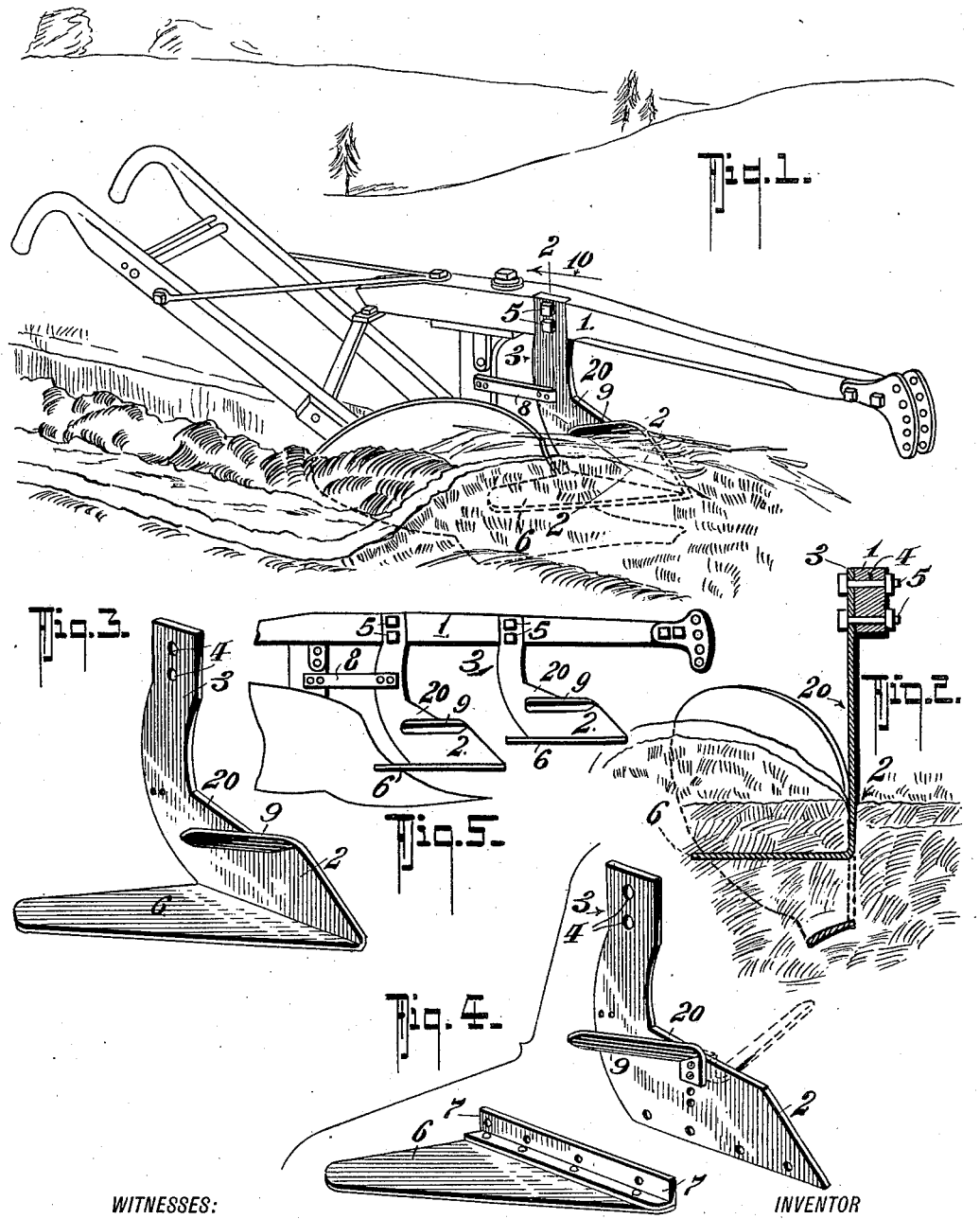
WITNESSES:
H. Woodard
Robert M. Greenwell
INVENTOR
H. K. Phipps
BY
Fed G. Dieterich & Co.
ATTORNEYS
COLUMBIA PLANOGRAPH CO., WASHINGTON, D. C.

UNITED STATES PATENT OFFICE.

HARRY KAHLE PHIPPS, OF EMLENTON, PENNSYLVANIA.

PLOW ATTACHMENT.

1,093,073.   Specification of Letters Patent.   Patented Apr. 14, 1914.

Application filed January 24, 1913. Serial No. 743,976.

*To all whom it may concern:*

Be it known that I, HARRY K. PHIPPS, residing at Emlenton, in the county of Venango and State of Pennsylvania, have invented certain new and useful Improvements in Plow Attachments, of which the following is a specification.

This invention is in the nature of an attachment for plows and is especially designed for being readily applied to the beam of any of the ordinary types of plows and so supported relatively to the plow whereby to split up and turn the sod as it is raised by the plow point.

Among other objects, my invention has for its purpose to provide an attachment of the character stated of a very simple and economical construction that can be readily applied to the plow beam and which effectively serves its intended purpose.

My invention consists in the peculiar construction and novel arrangement of the attachment as hereinafter fully described, specifically pointed out in the claims and illustrated in the accompanying drawing, in which:

Figure 1 is a perspective view of a plow with my improved attachment applied. Fig. 2 is a transverse section thereof taken substantially on the line on Fig. 1, looking in the direction indicated by the arrow 10. Fig. 3 is a perspective view of my improved plow attachment showing a preferred form. Fig. 4 is a detail view that shows a modified form of my attachment hereinafter referred to. Fig. 5 is a side elevation largely diagrammatic, illustrating a modification of the invention in which a plurality of attachments are used.

In the drawing, I have illustrated a simple type of plow to the beam 1 of which my attachment is applied. I desire it understood that two or more of the said attachments may be used, and when used the cutting members or sod turning blades of the several attachments are disposed at different horizontal planes or depths relatively to the plow point, the deepest being nearest the plow point, as indicated in Fig. 5 whereby to provide for splitting up and turning the sod a number of times.

My attachment, in its preferred form, as shown in Fig. 2, is a single member shaped up in any desired manner and it consists of a land side 2 the front end of which is inclined to form a penetrating or vertical cutting edge and the rear end is projected up to form a shank 3. The upper end of the shank 3 has apertures 4 for receiving the bolts 5 that clamp the said upper end on the plow beam as shown. The lower portion of the single member mentioned terminates in a horizontal cutter, or splitting blade 6, and the said blade 6 in the form shown in Fig. 3, is integral with and extends laterally from the lower edge of the land side 2, the front edge of the said blade being inclined on a plane substantially parallel with the backward incline of the mold board.

The land side 2 of my improved attachment has a portion of its upper edge 20 bent downwardly and inwardly to form a guard 9. This guard in the preferred form as shown in Fig. 1, is integral with the member 2 and is in the nature of an extension that is bent inwardly from the said member 2 over the cutting blade 6.

Instead of making the guard 9 as an integral member, it may be adjustably secured to the land side 2, as shown in Fig. 4, and when it is thus connected the said land side has a number of apertures to provide for setting the guard high or lower as the soil condition may make desirable.

It will be noticed by referring to Figs. 1 and 2, the cutter blade 6 is located in a plane above the plow point but yet it is sufficiently low to be at a point above the entrance portion of the mold board, such correlative arrangement of the blade 6 and the mold board serving to provide for slicing or splitting up the sod, and when a number of my attachments are used, the sod is split into a plurality of layers, each layer by reason of engaging the land side of the attachment and the mold board of the plows is thereby turned over.

Instead of making the attachment of a single piece, as is shown in Fig. 1, it may be made up of a number of pieces, see for example as shown in Fig. 4, which illustrates the land side and the cutting blade 6 as separate parts and arranged for being joined by an angle bar 7.

If desired, the attachment may be strengthened when applied for use, by a brace 8, as indicated in dotted lines on Figs. 1 and 3.

By reason of providing the land side 2 with a guard 9 as stated and shown, my attachment is especially well adapted for handling manure, straw or other ground material, since the straw, etc., is caused to drop down in front of and onto the cutting blade instead of going straight back and plowing.

When the guard 9 is arranged as a separate member, as in Fig. 4, it is readily reversible, since it may be attached either on the inside of the land side 2, as shown in full lines in Fig. 4, or on the outside, as indicated in dotted lines.

What I claim is:

1. An attachment for plows which comprises a thin metal body including a vertical penetrating portion having an upwardly extended shank for attachment to the plow beam, and a laterally and rearwardly extending splitting blade extending from the lower edge of said body in a plane at right angles thereto, and a guard member extending laterally from said body and lying in a plane inclined to the horizontal and to said cutting blade.

2. An attachment for mold board plows comprising a thin flat vertical web, including a front penetrating edge and a rear upwardly projecting shank adapted for attachment to the plow beam, a cutting blade extending horizontally from the lower edge of said body and held in a plane at right angles to said body, said body including a portion cut away and bent over laterally to lie in a plane inclined to the horizontal and form a guard member substantially as specified.

3. An attachment for mold board plows which comprises a vertically disposed thin metal body, which includes a front penetrating edge inclined to the horizontal, and a rear upwardly projecting shank for attachment to a plow beam, said body having a portion cut and bent laterally to form a guard member, a laterally projecting cutting blade lying in a horizontal plane and extending from and integrally formed with the lower edge of said body, all being arranged substantially as shown and described.

HARRY KAHLE PHIPPS.

Witnesses:
 MARY A. CROSS,
 JAMES A. LAWSON.

---

Copies of this patent may be obtained for five cents each, by addressing the "Commissioner of Patents, Washington, D. C."